Figures 1, 2, 3, 4:
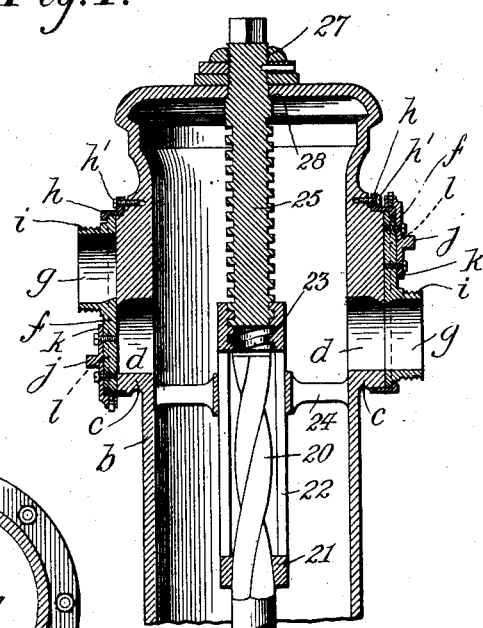

F. S. SEAGRAVE.
HYDRANT.
APPLICATION FILED MAR. 19, 1906.

906,944.

Patented Dec. 15, 1908.

UNITED STATES PATENT OFFICE.

FREDERIC SCOTT SEAGRAVE, OF DETROIT, MICHIGAN.

HYDRANT.

No. 906,944.      Specification of Letters Patent.      Patented Dec. 15, 1908.

Application filed March 19, 1906. Serial No. 306,923.

*To all whom it may concern:*

Be it known that I, FREDERIC SCOTT SEAGRAVE, of the city of Detroit, State of Michigan, United States of America, have invented certain new and useful Improvements in Hydrants; and I do hereby declare that the following is a full, clear, and exact description of the same.

My invention relates particularly to the valve for controlling the hose connections and the hydrant valve, and it has for its object to render devices of this kind more simple and less expensive. For full comprehension, however, of my invention reference must be had to the accompanying drawings forming a part of this specification, in which similar reference characters indicate the same parts and wherein—

Figure 1 illustrates a hydrant in longitudinal sectional view and provided with my invention; Fig. 2 is a face view of the hose connection valve, and Fig. 3 is a similar view of the hydrant valve; Fig. 4 is a detail sectional view of the valve and the parts connecting the same in place.

$b$ is the hydrant which according to my invention has a circular boss $c$ cast thereon or otherwise carried rigidly thereby and presenting a preferably flat bearing face which has an eccentric port $d$, a rotatable valvular disk $f$ with an eccentric port $g$ being held in water-tight bearing relation with the said face of such boss by a retaining ring $h$ secured upon the perimeter of the boss by screws $h'$ and having its edge overlapping the edge of the disk. An exteriorly screw-threaded nipple $i$ is carried rigidly by the disk concentric to the port therein its object being to allow a hose end to be coupled thereto, and a protuberance $j$ affords means whereby the same may be rotated by the usual fireman's hose key or spanner, such protuberance being preferably cast in one with a bar $k$ recessed longitudinally to accommodate a rib $l$ preferably cast in one with the disk and extending in a line intersecting the centers of the said disk and the port therein the radially outer end of such bar being bent at an angle as at $m$. This bent end of the bar has a hole $n$ bored therein with its inner end slightly reduced to prevent a ball $o$ passing entirely therethrough, a series of pieces of rubber or any other suitable packing indicated at $p$ being caused to bear with varying degrees of tension upon such ball by a screw $q$ and cause a portion of the ball to protrude through the diminished end of the hole and engage depressions $r$ formed at different angular positions in the perimeter of the retaining ring and temporarily retain the valvular disk against accidental displacement while allowing it to be moved under the force exerted by the fireman by means of his hose key.

My improved hydrant valve consists of a preferably flat plate 2 bolted between the flanged end of the branch 3 of the water main 4 and the lower flanged end 5 of the hydrant such plate presenting a bearing in which the lower end of a shaft member 6 is journaled while a preferably plano-convex valvular disk 7 is mounted rigidly upon the squared lower end of such shaft and rests in a preferably circular recess 8 in the plate 2.

A pair of ports 9 and 10 respectively, are formed one (9) in the plate 2 and the other (10) in the valvular member, and a pair of drainage ports 12 and 13 are formed in the plate 2 at right angles to one another, a notch 14 in the edge of the valvular plate adjacent to the port therein effecting a communication between such drainage ports when the valvular plate is in "shut-off" position, thereby presenting an effective drain for the hydrant.

The shaft member 6 has its upper end portion twisted to present a worm or spiral 20 adapted upon each stroke of an engaging reciprocatory actuating member to have imparted thereto preferably one-half of a complete rotation; and such engaging member comprises a rigid open square 21 adapted to fit slidably upon the spiral, and connected by rigid bars 22 to an internally threaded nut or block 23 of square cross-section retained against rotation by a transverse brace 24 secured rigidly to the interior of the hydrant and through which such square bar, while fitting snugly, is free to slide longitudinally. This internal thread is engaged by the screw threaded lower end 25 of a shaft member the upper end whereof is formed as usual to be engaged by the fireman's hose-key or spanner, while the intermediate portion is formed with a screw thread 27 to have the usual supporting nut rigidly secured thereto and a shoulder 28 to coact with such nut in retaining such shaft member rotatably in its proper position relatively to the hydrant top. These several shaft members constitute a reduction device by which the speed of rotation imparted by the fireman to the upper member is reduced during its transmission to the valvular disk mounted upon the lower shaft member. When the fireman turns the upper shaft member to open the valve the screw-threaded connection therebetween and the bar 23 causes the latter to move downwardly over the spiral 20 and during the complete downward stroke thereof rotate the latter and consequently the valvular disk one half turn thereby slowly opening the same, and a reverse action on the part of the fireman will slowly close the valve.

What I claim is as follows:—

1. A hydrant presenting a rigid circular face having therein an eccentric port communicating with the interior of the hydrant, a circular valvular disk mounted rotatably upon such face and having an eccentric port, means retaining the valvular disk in place, a rib formed upon the disk in a line intersecting the centers of the disk and the port therein, a bar recessed to fit over the rib and extending over the perimeter of the retaining ring, and means partly upon the retaining ring and partly upon the bar for limiting the rotary movement of the disk.

2. A hydrant presenting a rigid circular boss forming an integral part of the exterior of the said hydrant and having therein an eccentric port communicating with the interior of the hydrant, a circular valvular disk mounted rotatably upon such boss and having an eccentric port, a flanged retaining ring secured rigidly upon the boss and having its flange overlapping the periphery of the disk, a bar secured upon the disk and an angular boss projecting from the bar.

3. A hydrant presenting a rigid circular face having therein an eccentric port communicating with the interior of the hydrant, a circular valvular disk mounted rotatably upon such face and having an eccentric port, a flanged retaining ring secured rigidly upon the boss and having its flange overlapping the periphery of the disk, a rib formed upon the disk in a line intersecting the centers of the disk and the port therein, a bar recessed to fit over the rib and extending over the perimeter of the retaining ring, a ball and a resilient device located in a hole in the bar the ball bearing upon the perimeter of the retaining ring, an adjustable screw retaining the resilient device in bearing relation with the ball and an angular boss projecting from the bar.

4. The combination with a hydrant having a circular plate secured rigidly in the lower end thereof and having an eccentric port, of a valvular disk located beneath and countersunk in a recess in the underside of the said rigid plate and having an eccentric port therein, means extending from the exterior of the top of the hydrant to the valvular disk for rotating the latter, the said plate having a vertical drainage duct adjacent to the edge opposite to the port therein, and a horizontal drainage duct in the flange formed by the recess, and the disk having a notch cut in the edge thereof adjacent to the port in the said disk the said notch being adapted to effect a communication between the said ducts.

In testimony whereof, I have signed my name to this specification, in the presence of two subscribing witnesses.

FREDERIC SCOTT SEAGRAVE.

Witnesses:
WILLIAM P. McFEAT,
FRED J. SEARS.